Nov. 2, 1926.  
C. MEIXSELL  
1,605,753  
MILLING INSTRUMENT FOR LATHES  
Filed August 26, 1925   2 Sheets-Sheet 1
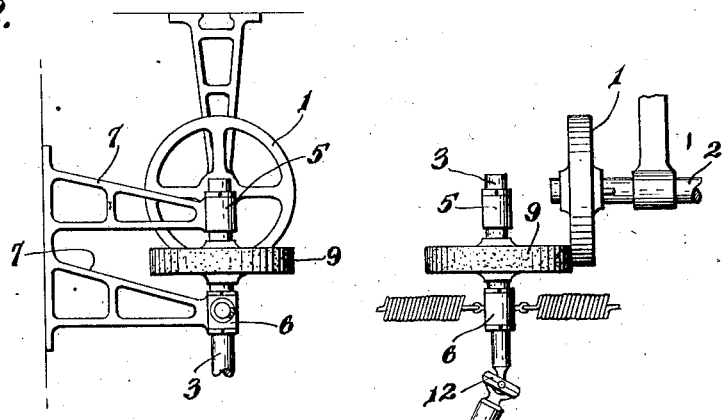
Fig. 2.
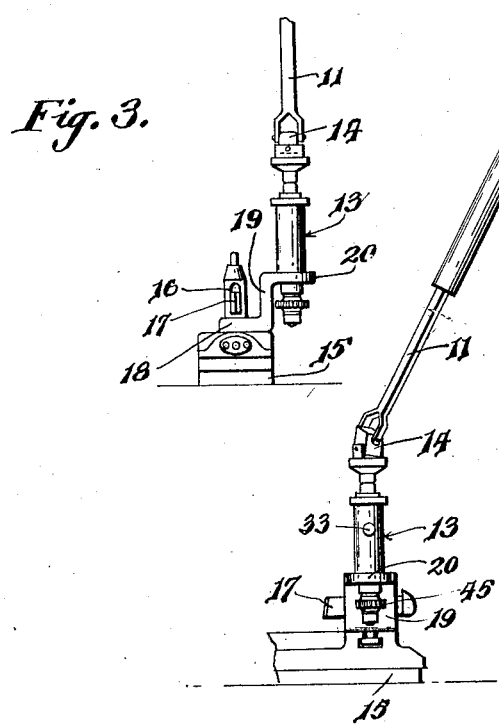
Fig. 1.  
Fig. 3.
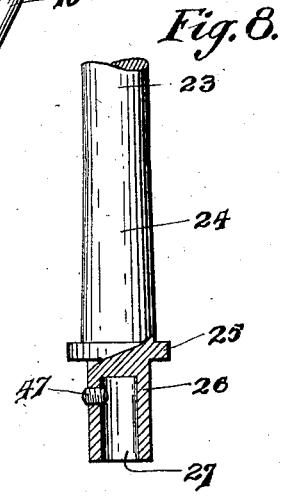
Fig. 8.
INVENTOR.  
Charles Meixsell.  
BY  
Geo. F. Kimmel  
ATTORNEY.

Nov. 2, 1926.  1,605,753
C. MEIXSELL
MILLING INSTRUMENT FOR LATHES
Filed August 26, 1925   2 Sheets-Sheet 2

INVENTOR.
Charles Meixsell.
BY
Geo. P. Kimmel.
ATTORNEY.

Patented Nov. 2, 1926.

1,605,753

UNITED STATES PATENT OFFICE.

CHARLES MEIXSELL, OF HARRISBURG, ILLINOIS.

MILLING INSTRUMENT FOR LATHES.

Application filed August 26, 1925. Serial No. 52,605.

This invention relates to a milling attachment for lathes, and has for its object to provide, in a manner as hereinafter set forth, a milling attachment for expeditiously converting a lathe into a milling machine with a power drive and feed, and which is capable of being efficiently employed for any character of work carried out by any ordinary form of milling machine.

Further objects of the invention are to provide, in a manner as hereinafter set foth, a milling attachment for lathes which is simple in its construction and arrangement, strong, durable, compact, thoroughly efficient in its use, conveniently and quickly installed with respect to a lathe, universely coupled with a driving means therefor and further including a universely coupled milling tool, and comparatively inexpensive to manufacture.

With the foregoing and other objects in view, the invention consists of a novel construction, combination and arrangement of parts, as hereinafter more specifically described and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:—

Figure 1 is an elevation of a milling attachment for lathes in accordance with this invention.

Figure 2 is a fragmentary view in elevation, illustrating the attachment frictionally operated from a driving means therefor.

Figure 3 is a fragmentary view in side elevation illustrating the milling tool connected with the lathe.

Figure 8 is a fragmentary view, in section, of the arbor of the milling tool.

Figure 4:
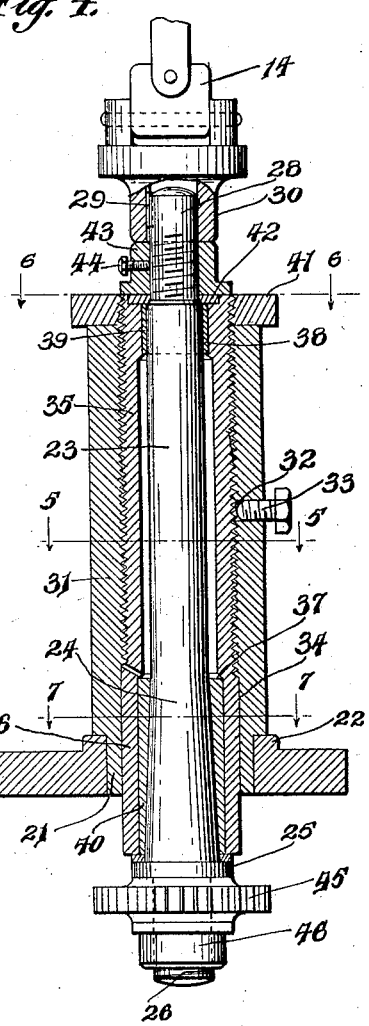
Figure 4 is a vertical sectional view of the milling tool.

Referring to the drawings in detail 1 denotes a driving pulley which is keyed lengthwise of an operating shaft 2 therefor and any suitable means, not shown, is employed for shifting the pulley 1 into frictional driving engagement with the milling attachment.

A milling attachment in accordance with this invention comprises an operating shaft 3 which is vertically disposed, and mounted in spaced bearings 5, 6, carried by spaced supports 7. The shaft 3 extends above the bearing 5 and below the bearing 6. Collars 8 are carried by the shaft 3 for the purpose of preventing the shifting of the shaft lengthwise with respect to the bearings 5 and 6. Fixed to the shaft 3, between the bearings 5 and 6, is a pulley 9 having its edge provided with a suitable brake lining. The pulley 1 is brought into frictional contact with the edge of the pulley 9 for the purpose of driving the same, causing thereby the operation of the shaft 3.

Arranged between the lower end of the shaft 3 and the milling tool, to be presently referred to, is an operating element for said tool and said operating element is lengthwise adjustable and consists of a substantially elongated tubular member 10, and a squared rod 11 which extends into and snugly fits the inner face of the member 10, and by this arrangement a slip joint is set up between the member 10 and the rod 11. The lower end of the shaft 3 is connected to the upper end of the member 10 by a universal joint connection 12. The milling cutter is referred to generally by the reference character 13, and the upper end thereof is connected to the lower end of the rods or bar 11 by a universal joint connection 14.

A portion of the lathe is indicated at 15, and is provided with tool posts 16, only one of which is shown and mounted on a tool post 16 and secured in position by a retaining device 17, is the outwardly extending base 18 of a support for the milling cutter. The support further includes a vertically extending intermediate portion 19 and an inwardly extending upper arm 20 which is disposed at right angles with respect to the intermediate portion 19 and formed with an opening 21. A boss 22 surrounds the opening 21 and is formed on the upper face of the arm 20 of the support.

Figure 5:
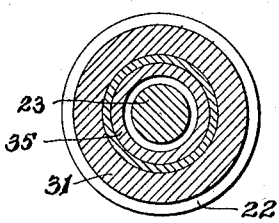
Figure 5 is a section on line 5—5, Figure 4.
Figure 6:
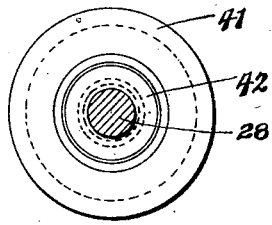
Figure 6 is a section on line 6—6, Figure 4.
Figure 7:
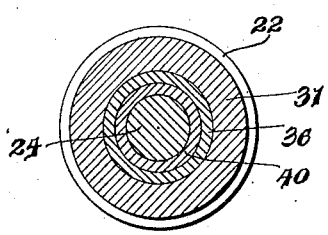
Figure 7 is a section on line 7—7, Figure 4.

The milling cutter, best shown in Figures 4 to 8, comprises an arbor 23 formed with a tapered lower portion 24, which terminates in a laterally extending annular flange 25 and below the flange 25, the arbor further includes a reduced peripherally threaded portion 26 provided with a socket 27. The upper end of the arbor 23 has a reduced peripherally threaded cylindrical portion 28 which is keyed as at 29 to the lower section 30 of the universal 14. The reduced upper portion 28 extends into the lower section 30 of the universal. Extending into the opening 21 and seated on the boss 22, is a vertically extending sleeve 31 having a portion of its inner face threaded. The sleeve 31 is furthermore formed with a lateral opening 32 having a threaded wall which is engaged by a set screw 33.

The inner diameter of the sleeve 31, at its lower portion is greater than the inner diameter of the upper portion of said sleeve 31, and that portion of greater diameter is indicated at 34. That portion of the inner face of the sleeve 31 above the portion of greater diameter 34 thereof is threaded throughout. Extending through the sleeve 31, as well as threadably engaging with the inner face of the latter, is an arbor guide formed of a tubular element 35, having its lower portion offset as at 36 to provide the inner face of said element 35 with a shoulder 37. The offset portion 36 provides the lower part of the tubular guide of greater inner and outer diameter than the upper portion of said guide. That portion of the outer face of the guide, above the offset portion 36 of the guide, is threaded throughout and engages with the threads on the inner face of the sleeve 31. The offset portion 36 of the tubular element 35 is positioned in that part of larger diameter of the tubular member 31 and depends below the lower edge of said member 31. The inner face of the tubular element 35, at the upper portion thereof is inset as at 38 to provide the portion of the inner face of said element 35, at its upper end, of reduced diameter and bearing against said inset portion 38 is a bearing sleeve 39. Arranged against the inner face of the offset portion 36 of the tubular element 35 and abutting against the shoulder 37 is a bearing sleeve 40 having its inner face conforming in shape to the diameter of a tapered portion 24 of the arbor 23. The tubular element 35 extends a substantial distance above the top of the member 31, and engaging therewith is an adjusting nut 41. Seated in the top of the tubular element 35 is a packing washer 42 and which surrounds the reduced portion 28 of the arbor 23. Threadably engaging with the reduced portion 28 of the arbor 23 and abutting against the upper end of the tubular element 35, is an adjusting nut 43 provided with a set screw 44.

Positioned on the reduced end 26, of the arbor 23, and abutting against the flange 25, is a milling cutter or tool 45, which is retained in position by a clamping nut 46, threadably engaging with the threads on the periphery of the reduced portion 26 of the arbor 23.

The nut 43 is provided for the purpose of holding up the arbor, as well as taking up the arbor when wear is had on the end of the arbor where the tool or cutter is attached. The purpose of the nut 41 is for elevating and raising the tool 45 to different positions when occasion so requires.

The socket 27, in the lower end of the arbor 23, provides means for positioning an end mill in and which is held in position by the set screw 47. By this arrangement the attachment can be used for end mills and standard milling cutters for cutting teeth, reamers, taps and for squaring shafting, and practically anything else that can be done on a standard milling machine.

Owing to the construction and arrangement of the milling attachment, it can be quickly coupled up in connection with the lathe, and further quickly positioned with respect to the driving means therefor, and as any type of tool can be employed with the attachment, it is obvious that any character of work can be performed thereby which is similar to any form of work performed by any ordinary form of milling machine, and therefore it is thought that the many advantages, of a milling attachment for lathes, in accordance with this invention can be readily understood, and although the preferred embodiment of the invention is as illustrated and described, yet it is to be understood that changes in the details of the construction can be had which will fall within the scope of the invention as claimed.

What I claim is:—

1. A milling attachment for lathes comprising a support adapted to be removably connected to the lathe and having its upper end formed with an inwardly extending right angularly disposed arm provided with an opening, a stationary sleeve mounted on said arm and extending into said opening, a vertically disposed revoluble milling tool arbor mounted in and projecting from each end of the sleeve, a tubular guide threadably engaging with the sleeve, surrounding the arbor and extended from each end of the sleeve, a bearing positioned between the upper end of the sleeve and the arbor, a bearing positioned between the lower end of the guide and the arbor, a universal joint connection attached to the upper end of the arbor exteriorly of the guide, a lengthwise adjustable driving member for the arbor attached to said joint connection, a vertically disposed frictionally operated driving means for said member, and a universal joint connection between the lower end of said means and the upper end of said member.

2. A milling attachment for lathes comprising a support adapted to be removably connected to the lathe and having its upper end formed with an inwardly extending right angularly disposed arm provided with an opening, a stationary sleeve mounted on said arm and extending into said opening, said sleeve having the lower portion of its inner face offset, a tubular guide mounted in and threadably engaging with the sleeve, said guide having an offset lower portion bearing against the offset portion of the inner face of the sleeve and further extending below the latter, said guide extending above the sleeve, an arbor extending through the guide and projecting above and below the ends thereof, a bearing interposed between the offset portion of the guide and said arbor, a bearing interposed between the upper end of the guide and the arbor, means carried by the arbor and engaging the guide to prevent the lowering movement of the arbor independent of the guide, means engaging with the guide and the upper end of sleeve for clamping the latter against said arm, and a driving means connected to the upper end of the arbor.

3. A milling attachment for lathes comprising a support adapted to be removably connected to the lathe and having its upper end formed with an inwardly extending right angularly disposed arm provided with an opening, a stationary interiorly threaded sleeve seated on said arm and extending into said opening, a peripherally threaded guide extending through and threadably engaging with said sleeve and further extending above and depending below the latter, means engaging with the projecting upper end of the guide for clamping the sleeve to said arm, an arbor extending through said guide and provided on its lower end with a flange against which the lower end of the guide abuts, said guide having an offset lower portion, a bearing interposed between said offset portion and the arbor, said sleeve having its inner face at the upper end thereof inset, a bearing interposed between said inset portion and the arbor, a nut secured to the upper end of said arbor and engaging the upper end of the guide to prevent lowering movement of the arbor relative to the guide, a universal joint connection attached to said arbor above said nut, and an overhead driving means connected to said connection for operating the arbor.

4. A milling attachment for lathes comprising a support adapted to be removably connected to the lathe and having its upper end formed with an inwardly extending right angularly disposed arm provided with an opening and a boss on its upper face surrounding the opening, a stationary sleeve provided with a reduced lower terminal portion, said sleeve seating on said boss and having said portion extending into said opening, a tubular guide having an offset lower portion, said guide above said offset lower portion threadably engaging with the inner face of said sleeve, said guide extending above and depending below the sleeve, an arbor extending through said guide and projecting above and depending below the ends of the guide, said arbor including a flange against which seats the lower end of said guide, means on the upper end of the guide for clamping said sleeve against said boss, means to prevent the shifting of the arbor lengthwise relative to the guide, a universal joint connection carried on the upper ends of the arbor above said means to prevent shifting of the arbor relative to the guide, and an overhead driving means attached to said connection for operating the arbor.

5. A milling attachment for lathes comprising a support adapted to be removably connected to the lathe and having its upper end formed with an inwardly extending right angularly disposed arm provided with an opening and a boss on its upper face surrounding the opening, a stationary sleeve provided with a reduced lower terminal portion, said sleeve seating on said boss and having said portion extending into said opening, a tubular guide having an offset lower portion, said guide above said offset lower portion threadably engaging with the inner face of said sleeve, said guide extending above and depending below the sleeve, an arbor extending through said guide and projecting above and depending below the ends of the guide, said arbor including a flange against which seats the lower end of said guide, means on the upper end of the guide for clamping said sleeve against said boss, means to prevent the shifting of the arbor lengthwise relative to the guide, a universal joint connection carried on the upper ends of the arbor above said means to prevent shifting of the arbor relative to the guide, an overhead driving means attached to said connection for operating the arbor, a bearing between the upper end of the arbor and the upper end of the guide, and a bearing interposed between the arbor and the offset portion of the guide.

6. A milling attachment for lathes comprising a support adapted to be removably connected to the lathe and having its upper end formed with an inwardly extending right angularly disposed arm provided with an opening, a revoluble, vertically disposed milling tool arbor device seated on said arm and extended through said opening and including an arbor member and a tubular guide therefor, an overhead vertically disposed shaft, supporting means therefor, a frictional driving disc for the shaft, a lengthwise adjustable driving member for said arbor member operated from and having a universal joint connection at its upper end with the lower end of said shaft and further having a universal joint connection at its lower end with the upper end of the arbor member exteriorly of the guide for the latter.

In testimony whereof, I affix my signature hereto.

CHARLES MEIXSELL.